Sept. 3, 1946. W. G. HOWARD 2,407,079
HOLDING TRAY FOR EGG TREATING MACHINES
Filed June 28, 1944
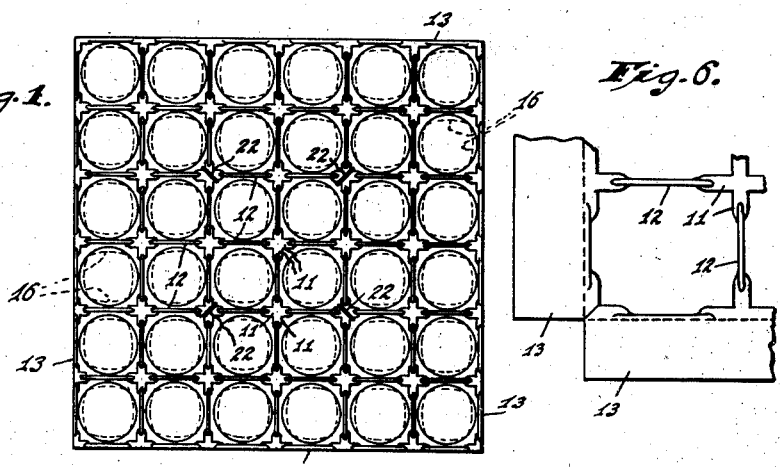
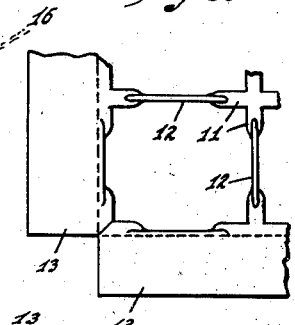
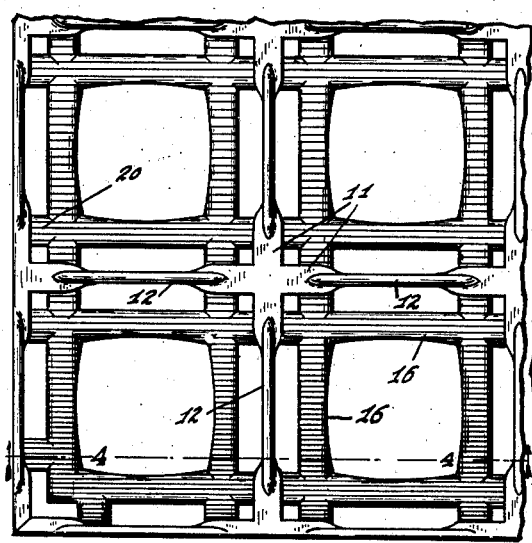
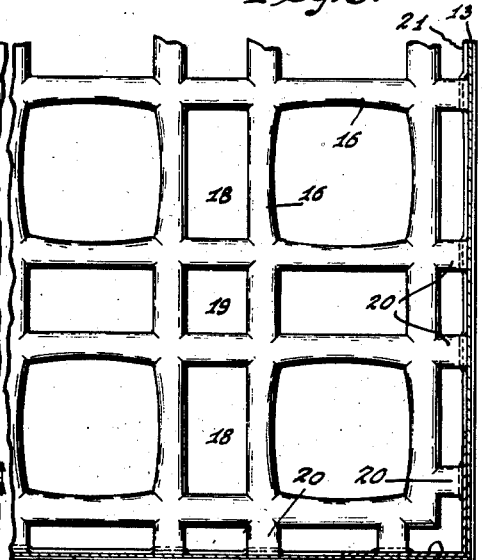
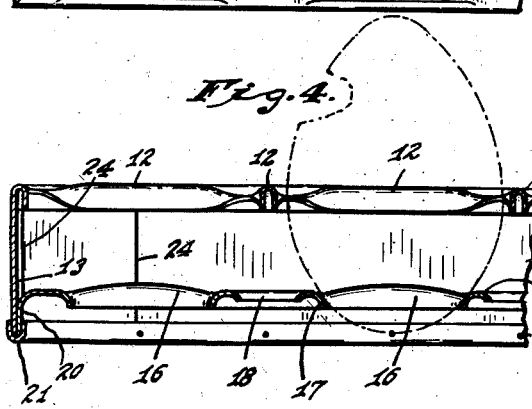
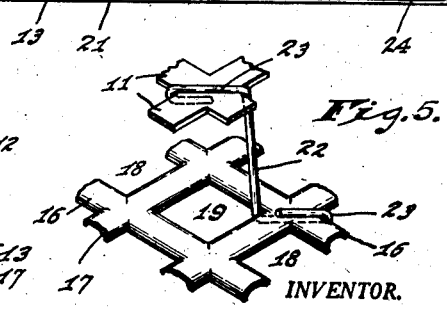
INVENTOR.
WILLIS G. HOWARD,
BY Hood & Hahn
ATTORNEYS.

Patented Sept. 3, 1946

2,407,079

UNITED STATES PATENT OFFICE 2,407,079

HOLDING TRAY FOR EGG TREATING MACHINES

Willis G. Howard, Indianapolis, Ind.

Application June 28, 1944, Serial No. 542,585

1 Claim. (Cl. 220—21)

It is now common practice to immerse food eggs in a bath of heated oil which serves to seal the porous shell and slightly coagulate the inner lining of the shell to such an extent that the entry of air to the edible body of the egg and consequent deterioration will be delayed for a considerable period during which the egg will be saleable and edible as the equivalent of a freshly laid egg.

Convenient apparatus for accomplishing such treatment usually includes a rigid cellular tray of metal, capable of receiving the usual planar 36-egg group commonly found in shipping crates.

In thus treating eggs care must be exercised to avoid marring the shells by scratches or cracks and the tray must be so formed that, as tray and eggs descend into the hot oil, the eggs will be sufficiently disturbed to insure complete oil coating yet not enough to dislodge the eggs from the cells of the tray.

Many such trays are required in the economic operation of the treating apparatus and they must be handled rapidly and repeatedly.

The object of my invention is to produce, at low cost, such a tray that will be sturdy and egg protective.

The accompanying drawing illustrates my improved tray.

Fig. 1 is a top plan of an egg filled tray;

Fig. 2 a fragmentary top plan, full size;

Fig. 3 is a fragmentary bottom plan;

Fig. 4 is a fragmentary section on line 4—4 of Fig. 3;

Fig. 5 is a fragmentary perspective; and

Fig. 6 is a fragmentary plan of the top sheet of the tray in an intermediate stage of formation.

The tray comprises two parallel sheets of metal, conveniently thin tinned iron sheets such as are used for tin cans. The upper sheet is medially perforated with 36 square perforations to form two crossing series of bars 11, 11 the opposite edges of which, medially between junctions with crossing bars, are pinched downwardly and toward each other, as shown at 12, Fig. 4, to form stiffening ribs so spaced from adjacent ribs as to form pockets large enough to receive the eggs at approximately their largest diameters, and presenting to the eggs smooth, non-edged surfaces so that the egg shells cannot be scratched or marred thereby. This sheet surrounding the group of perforations has four lips 13 which are bent down at right angles to the main body of the sheet to form the side walls of the tray and defining the depth of the tray.

The second sheet is similarly perforated to form two series of crossing bars 16, 16 defining square perforations registering with the egg-receiving perforations of the upper sheet, and the opposite edges of these bars are medially bent downwardly and outwardly, as shown at 17, Fig. 4, to form pockets for the blunt ends of the eggs which will present smooth non-edged surfaces to the inserted eggs (Fig. 4). This sheet is medially perforated at 18, 18 and 19, 19 to reduce weight, and, surrounding the group of perforations, is provided with short, downwardly-turned lips 20 to parallel and fit within the downturned lips 13 of the upper sheet. The vertical extent of the down-turned lips 20 is such that any egg resting on bars 16 will not project below the plane defined by the U-shaped bottom strip 21 which embraces the lower edges of lips 13 and 20 and forms a smooth surface which permits easy sliding of the tray over any supporting surface.

The two sheets of the tray are medially braced and spaced by wire struts 22, 22 the ends of which are bent, at 23, 23, to embrace bars 11 and 16 at junction points where they cannot be contacted by eggs, as shown in Fig. 5.

The down-turned lips 13, at adjacent ends, are stiffened and connected by an angle 24 soldered at each vertical corner of the tray.

The above-described structure, while very light, may be rapidly handled without distortion and thoroughly protects the eggs against injury.

The eggs may freely wobble in the cells of the tray and, as the tray enters the bath, the eggs will be momentarily floated and the tray precedes the eggs so that a thorough and uniform coating of the eggs is obtained.

It will be noted that distortions of bars 11 are only at the middles of the portions between junctions with the crossing bars 11 so that the junction points remain flat, as clearly illustrated in Fig. 2. I have found in practice that if the distorted portions 12 extend too near to the junctions of the crossing bars, the metal is apt to be so weakened that repeated vertical distortions of the plate, which are bound to occur under the rather rough handling of the operators, will cause breakages at these junction points.

I have found that the distance between parallel adjacent portions 12 should be a little greater than the largest diameter of the largest egg, commonly found in the market; that the maximum spacing between the parts 16 of the lower plate should be the average egg diameter at a point about ⅙ of the egg length and that the vertical spacing of the two plates should be somewhere in the neighborhood of ⅞ of an inch.

By maintaining such dimensions, no egg will contact more than two parts 12; each egg will be free to be dislodged from its four point contact with the parts 16 as the tray descends to the treating oil; the largest eggs will not be pinched between parts 12; and the smallest egg cannot possibly topple over enough to get under any one of the parts 12.

I claim as my invention:

In an egg tray comprising two vertically spaced sheet metal plates, each having a plurality of medial perforations defined by two series of connected spaced strips, the strips of one series lying at right angles to the strips of the other series and medially distorted downwardly at opposite edges short of the junction points so as to clear said edges from possible contact with eggs nested in the structure, the effective dimensions of the perforations in the upper plate being greater than the largest diameter of the largest eggs to be handled and the effective diameter of the perforations of the lower plate being substantially less than the largest diameter of the smallest egg to be handled, the two plates being vertically spaced less than half the length of the smallest egg to be handled, the upper sheet having four downwardly extending flanges each lying in a plane at right angles to the planes of adjacent flanges and each of the four flanges bonded with two adjacent flanges, the lower sheet having four downwardly extending flanges each lying in a plane at right angles to the planes of adjacent flanges and nested within the flanges of the upper sheet, and means bonding the lower edge of the flanges of the two sheets together.

WILLIS G. HOWARD.